US012799309B2

(12) United States Patent
Cavalieri et al.

(10) Patent No.: US 12,799,309 B2
(45) Date of Patent: Nov. 17, 2026

(54) SOFT POLYPROPYLENE COMPOSITIONS

(71) Applicant: Basell Poliolefine Italia S.r.l., Milan (IT)

(72) Inventors: Claudio Cavalieri, Ferrara (IT); Cristina Cova, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 424 days.

(21) Appl. No.: 18/694,667

(22) PCT Filed: Sep. 9, 2022

(86) PCT No.: PCT/EP2022/075094
§ 371 (c)(1),
(2) Date: Mar. 22, 2024

(87) PCT Pub. No.: WO2023/052083
PCT Pub. Date: Apr. 6, 2023

(65) Prior Publication Data

US 2024/0384077 A1 Nov. 21, 2024

(30) Foreign Application Priority Data

Sep. 28, 2021 (EP) .................................... 21199319

(51) Int. Cl.
*C08L 23/08* (2025.01)
*C08L 23/10* (2006.01)
*C08L 23/16* (2006.01)
*C08L 53/02* (2006.01)

(52) U.S. Cl.
CPC ........... *C08L 23/08* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |
| 4,522,930 A | 6/1985 | Albizzati et al. | |
| 7,291,676 B2 | 11/2007 | Berta | |
| 2011/0129627 A1* | 6/2011 | Schedenig | C08F 2/001 525/89 |
| 2018/0237625 A1 | 8/2018 | Trenor et al. | |
| 2021/0108059 A1* | 4/2021 | Ek | C08L 53/02 |

FOREIGN PATENT DOCUMENTS

| | | | |
|---|---|---|---|
| EP | 0045977 | A2 | 2/1982 |
| EP | 0472946 | A2 | 3/1992 |
| WO | 0063261 | A1 | 10/2000 |
| WO | 0157099 | A1 | 8/2001 |
| WO | 03011962 | A1 | 2/2003 |
| WO | 2007082571 | A1 | 7/2007 |
| WO | 2013144060 | A1 | 10/2013 |
| WO | 2017122022 | A1 | 7/2017 |

OTHER PUBLICATIONS

The International Search Report and The Written Opinion for PCT/EP2022/075094 mailed Dec. 15, 2022.

* cited by examiner

*Primary Examiner* — Satya B Sastri

(57) ABSTRACT

A propylene polymer composition made from or containing:

A) 65 to 95 wt % of a polypropylene composition having a MFR (230 °C/2.16 kg) from 0.2 to 1.2 g/10 min, made from or containing
  (a) 15 to 45 wt % of a fraction made from or containing a propylene homopolymer, or a copolymer of propylene with ethylene or a $CH_2{=}CHR$ alpha-olefin, having a fraction insoluble in xylene at 25°°C for at least 90 wt %; and
  (b) 55 to 75 wt % of a fraction made from or containing a copolymer of ethylene with propylene or $CH_2{=}CHR$ alpha-olefins, containing ethylene derived-units in a quantity lower than 40 wt %, and having solubility in xylene at 25 °C greater than 60 wt %, and (B) 5 to 35 wt % of recycled styrene block copolymer having a melt flow rate (190 °C/2.16 Kg) from 0.5 to 15 g/10 min, wherein the propylene polymer composition having a MFR from 0.4 to 1.4 g/10 min.

14 Claims, No Drawings

SOFT POLYPROPYLENE COMPOSITIONS

This application is the U.S. National Phase of PCT International Application PCT/EP2022/075094, filed Sep. 9, 2022, claiming benefit of priority to European Patent Application No. 21199319.1, filed Sep. 28, 2021, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure relates to soft polypropylene compositions made from or containing recycled elastomeric material.

BACKGROUND OF THE INVENTION

Polyolefin compositions, having elastic properties and thermoplastic behavior, are used in many application fields. In some instances, the polyolefin compositions are selected for the compositions' chemical inertia, mechanical properties, and nontoxicity. In some instances, the polyolefin compositions are prepared into finished products with the same techniques used for thermoplastic polymers. In some instances, the polyolefin compositions are used in the medical field, packaging, extrusion coating, and electrical wires and cables covering.

In some instances, elastic polypropylene compositions are not fully useful for some applications, including roofing applications. Notably and for some applications, the elastic polypropylene compositions do not provide an adequate balance of softness, flexibility, and mechanical properties such as tear and puncture resistance.

In some instances, polyolefin compositions raise concerns of sustainability because production is based on non-renewable sources.

Efforts to address issues of sustainability through polyolefin recycling have shown limited success because commercially available recycled products are contaminated with heterogeneous materials.

In some instances, polymer compositions made from or containing recycled materials are perceived as having lower reliability and lower performance with respect to compositions made of virgin polymers, in the absence of recycled materials.

SUMMARY OF THE INVENTION

In a general embodiment, the present disclosure provides a propylene polymer composition, having a value of melt flow rate (ISO 1133 230 °C/2.16 kg) ranging from 0.4 g/10 min to 1.4 g/10 min, alternatively 0.5 to 1.2 g/10 min, alternatively from 0.6 to 1.0 g/10 min, made from or containing:

A) from 65 to 95 wt %, alternatively from 70 to 93 wt %, alternatively from 75 to 92 wt %, of a polypropylene composition, having a MFR ranging from 0.2 to 1.2 g/10 min, made from or containing:
  - from 15 to 40 wt %, alternatively from 28 to 40 wt %, alternatively from 20 to 35 wt %, of a polymer fraction (a) made from or containing
    - a propylene homopolymer, or a copolymer of propylene with one or more comonomers selected from ethylene and a $CH_2{=}CHR$ alpha-olefin, where R is a $C_2$-$C_8$ alkyl radical, or mixtures thereof;
  - wherein the copolymer containing at least 85 wt % of units derived from propylene and the polymer fraction (a) being insoluble in xylene at 25 °C for at least 90 wt %; and
  - from 60 to 85 wt %, alternatively from 60 to 72 wt %, alternatively from 65 to 80 wt %, of a polymer fraction (b) made from or containing
    - a copolymer of ethylene with comonomers selected from propylene and $CH_2{=}CHR$ alpha-olefins, where R is a $C_2$-$C_8$ alkyl radical, and optionally with minor quantities of a diene, or mixtures thereof;
    - wherein the copolymer containing units derived from ethylene in a quantity lower than 40 wt % and the polymer fraction (b) having solubility in xylene at 25 °C greater than 60 wt %,
  - wherein the total percentage of fractions (a) and (b) being 100, and (B) from 5 to 35 wt %, alternatively from 7 to 30 wt %, alternatively from 8 to 25 wt %, of recycled styrene block copolymer (SBC), having a melt flow rate (ISO 1133 230 °C/2.16 kg) from 0.5 to 15 g/10 min;

the percentages of (A) and (B) being referred to the sum of (A) and (B).

In some embodiments, the xylene insoluble fraction of polymer fraction (a) has an intrinsic viscosity of from 1.2 to 1.9 dl/g. In some embodiments, the polymer fraction (a) has a melt flow rate (ISO 1133 230 °C/2.16 kg) of from 2 to 70 g/10 min, alternatively of from 10 to 50 g/10 min, alternatively of from 15 to 40 g/10 min.

DETAILED DESCRIPTION OF THE INVENTION

As used herein, the term "copolymer" refers to both polymers with two different recurring units and polymers with more than two different recurring units, such as terpolymers, in the chain. As used herein, the term "ambient or room temperature" refers to a temperature of about 25 °C As used herein, the term "crystalline propylene polymer" refers to a propylene polymer having an amount of isotactic pentads (mmmm), measured by $^{13}$C-MNR on the fraction insoluble in xylene at 25 °C, higher than 70 molar %. As used herein, the term "elastomeric" polymer refers to a polymer having solubility in xylene at ambient temperature higher than 50 wt %.

As used herein, the term "consisting essentially of" refers to, in connection with a polymer or polymer composition made from or containing mandatory components, the polymer or polymer composition optionally further having other components present, provided that the essential characteristics of the polymer or polymer composition are not materially affected by the presence of the other components. In some embodiments, components that do not materially affect characteristics of the polymer or polymer composition are selected from the group consisting of catalyst residues, antistatic agents, melt stabilizers, light stabilizers, antioxidants, and antiacids.

The features of the components forming the polypropylene composition are not inextricably linked to each other. In some embodiments, a level of a feature does not involve the same level of the remaining features of the same or different components. In some embodiments, any component (A) to (B) and any range of features of components (A) to (B) is combined with any range of one or more of the features of components (A) to (B) and with any possible additional component and the component's features.

In some embodiments, polymer fraction (a) is selected from propylene copolymers containing from 1.0 to 10.0 wt %, alternatively from 2.0 to 8.0 wt %, of ethylene or a $C_4$-$C_{10}$ α-olefin or combination thereof. In some embodiments, the comonomer is ethylene.

In some embodiments and in polymer fraction (a), the amount of isotactic pentads (mmmm), measured by $^{13}C$-MNR on the fraction insoluble in xylene at 25 °C, is higher than 96.5 molar %, alternatively higher than 97 molar %, with respect to propylene units.

In some embodiments, polymer fraction (a) shows a molecular weight distribution, expressed by the ratio between the weight average molecular weight and numeric average molecular weight, (Mw/Mn), measured by GPC, equal to or higher than 5.0, alternatively from 7 to 20.

In some embodiments, the polydispersity index of polymer fraction (a) ranges from 3 to 10.

In some embodiments, the melt flow rate (ISO 1133 230 °C/2.16 kg) of polymer fraction (a) ranges from 10 to 50 g/10 min, alternatively from 15 to 40 g/10 min, alternatively from 20 to 35 g/10 min.

In some embodiments, polymer fraction (a) is insoluble in xylene at 25 °C for at least 90 wt %, alternatively for at least 95 wt %, alternatively totally insoluble.

In some embodiments, polymer fraction (b) is an ethylene-propylene copolymer. In some embodiments, the amount of ethylene in the copolymer ranges from lower than 40 wt %, alternatively from 20 to 35wt %, alternatively from 23 to 30wt %.

In some embodiments, polymer fraction (b) exhibits a solubility in xylene at 25 °C higher than 60 wt %, alternatively higher than 65 wt %, alternatively higher than 75 wt %, alternatively higher than 90%, of copolymer (b). In some embodiments, polymer fraction (b) is totally soluble in xylene at 25 °C. In some embodiments, the intrinsic viscosity of the xylene soluble fraction at 25 °C is higher than 2.0 dl/g, alternatively ranging from 2.5 to 5, alternatively from 2.8 to 4 dl/g.

In some embodiments, polypropylene composition (A) has a melt flow rate ranging from 0.2 to 1.2 g/10 min, alternatively from 0.3 to 1.0 g/10 min. In some embodiments, the total ethylene content ranges from 15.0 to 28.0% wt, alternatively from 16.0 to 23.0 wt %, alternatively from 17 to 22% wt, based on the total weight of polypropylene composition (A).

In some embodiments, the polypropylene composition (A) has a tensile modulus value ranging from 40 to 250 MPa, alternatively from 50 to 200 MPa, alternatively from 60 to 150 MPa.

In some embodiments, the value of stress at break ranges from 5 to 40 $N/mm^2$, alternatively from 10 to 30 $N/mm^2$.

In some embodiments, the value of Shore D (15 sec) ranges from 25 to 40.

In some embodiments, the value of tear resistance ranges from 50 to 100 N, alternatively from 60 to 90N.

In some embodiments, the value of the puncture resistance (max force) ranges from 150 to 350 N, alternatively from 200 to 300 N.

In some embodiments, the value of the puncture resistance (deformation at break) ranges from 20 to 80 mm, alternatively from 30 to 50 mm.

In some embodiments, the polypropylene composition (A) is prepared by polymerization in sequential polymerization stages, with each subsequent polymerization being conducted in the presence of the polymeric material formed in the immediately preceding polymerization reaction. In some embodiments, the polymerization stages are carried out in the presence of a Ziegler-Natta catalyst. In some embodiments, the polymerization stages are carried out in the presence of a catalyst made from or containing the product of the reaction between:

i) a solid catalyst component made from or containing Ti, Mg, Cl, and an internal electron donor compound;

ii) an alkylaluminum compound and, iii) an external electron-donor compound having the formula:

$(R^7)a(R^8)bSi(OR^9)c$, where a and b are integers from 0 to 2, c is an integer from 1 to 4 and the sum (a+b+c) is 4; $R^7$, $R^8$, and $R^9$ are alkyl, cycloalkyl, or aryl radicals with 1-18 carbon atoms, optionally containing heteroatoms.

In some embodiments, the internal donor is selected from the esters of mono or dicarboxylic organic acids such as benzoates, malonates, phthalates, and certain succinates. In some embodiments, the internal donors are as described in U.S. Pat. No. 4,522,930, European Patent No. 045977A2, and Patent Cooperation Treaty Publication Nos. WO00/63261 and WO01/57099. In some embodiments, the internal donor is selected from the group consisting of phthalic acid esters. In some embodiments, the phthalic acid ester is selected from the group consisting of diisobutyl phthalate, dioctyl phthalate, diphenyl phthalate, and benzyl-butyl phthalate.

In some embodiments, the particles of solid component (i) have substantially spherical morphology and an average diameter ranging between 5 and 150 μm, alternatively from 20 to 100 μm, alternatively from 30 to 90 μm. As used herein, the term "substantially spherical morphology" refers to particles having the ratio between the greater axis and the smaller axis equal to or lower than 1.5, alternatively lower than 1.3.

In some embodiments, the solid catalyst component (i) is prepared by reacting a titanium compound of formula $Ti(OR)q-yXy$, where q is the valence of titanium and y is a number between 1 and q, with a magnesium chloride deriving from an adduct of formula $MgCl_2 \cdot pROH$, where p is a number between 0.1 and 6, alternatively from 2 to 3.5, and R is a hydrocarbon radical having 1-18 carbon atoms. In some embodiments, the titanium compound is $TiCl_4$. In some embodiments, the adduct is prepared in spherical form by mixing alcohol and magnesium chloride, operating under stirring conditions at the melting temperature of the adduct (100°-130 °C). Then, the adduct is mixed with an inert hydrocarbon immiscible with the adduct, thereby creating an emulsion which is quickly quenched causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with Ti compound or subjected to thermal controlled dealcoholation (80°-130 °C), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold $TiCl_4$; the mixture is heated up to 80°-130 °C and maintained at this temperature for 0.5-2 hours. In some embodiments, the treatment with $TiCl_4$ is carried out one or more times. In some embodiments, the electron donor compound is added during the treatment with $TiCl_4$.

In some embodiments, the alkyl-Al compound (ii) is selected from the group consisting of trialkyl aluminum compounds, alkylaluminum halides, alkylaluminum hydrides, and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichloride selected from the group consisting of $AlEt_2Cl$ and $Al_2Et_3Cl_3$. In some embodiments, the alkyl-Al compound (ii) is a mixture including trialkylaluminums. In some embodiments, the Al/Ti ratio is higher than 1, alternatively ranges between 50 and 2000.

In some embodiments, the silicon compounds (iii) are wherein a is 1, b is 1, c is 2, at least one of $R^7$ and $R^8$ is selected from branched alkyl, cycloalkyl, or aryl groups with 3-10 carbon atoms, optionally containing heteroatoms, and $R^9$ is a $C_1$-$C_{10}$ alkyl group. In some embodiments, $R_9$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, (2-ethylpiperidinyl)thexyldimethoxysilane, (3,3,3-trifluoro-n-propyl)(2-ethylpiperidinyl)dimethoxysilane, and methyl(3,3,3-trifluoro-n-propyl)dimethoxysilane. In some embodiments, the silicon compounds are wherein a is 0, c is 3, $R^8$ is a branched alkyl or cycloalkyl group, optionally containing heteroatoms, and $R^9$ is methyl. In some embodiments, the silicon compounds are selected from the group consisting of cyclohexyltrimethoxysilane, t-butyltrimethoxysilane, and thexyltrimethoxysilane.

In some embodiments, the amount of external electron donor compound (iii) provides a molar ratio between the alkylaluminum compound and the external electron donor compound (iii) of from 0.1 to 200, alternatively from 1 to 100, alternatively from 3 to 50.

In some embodiments, the polymerization process for preparing the polypropylene compositions is as described in European Patent Application No. 472946A.

In some embodiments, the polymerization stages occur in gas phase. In some embodiments, the reaction temperature in the polymerization stage for the preparation of the polymer fraction (a) and in the preparation of the copolymer fraction (b) are the same or different. In some embodiments, the reaction temperature in the polymerization stage is from 40° to 90 °C. In some embodiments, the reaction temperature ranges from 50° to 80 °C in the preparation of the fraction (a). In some embodiments, the reaction temperature ranges from 40° to 80 °C for the preparation of components (b). In some embodiments, the pressure of the polymerization stages to prepare the fractions (a) and (b), is from 5 to 30 bar in gas phase. In some embodiments, the residence times relative to the two stages determines the ratio between the fractions (a) and (b). In some embodiments, the residence times range from 15 minutes to 8 hours. In some embodiments, molecular weight regulators are used. In some embodiments, the molecular weight regulators are chain transfer agents. In some embodiments, the molecular weight regulator is hydrogen or $ZnEt_2$.

In some embodiments, the polypropylene composition made from or containing polymer fraction (a) and polymer fraction (b) is subjected to a chemical treatment with organic peroxides, thereby lowering the average molecular weight and increasing the melt flow index.

The component B is a recycled styrene block copolymer (r-SBC).

In some embodiments, the styrene block copolymers have blocks derived from a diene. such as polybutadiene or polyisoprene blocks, and blocks derived from polystyrene or derivatives thereof. In some embodiments, the block copolymers are different types. In some embodiments, the types are selected from the group consisting of AB, ABA, and A (B)4 type. In some embodiments, the block copolymers are hydrogenated. In some embodiments, a mixture of block copolymers is used.

In some embodiments, the styrene block copolymer has formula A-B-A', where A and A' are each a thermoplastic endblock which includes a styrenic moiety and where B is an elastomeric polybutadiene, poly(ethylenebutylene), or poly(ethylenepropylene) midblock. In some embodiments, the A and A' endblocks of the block copolymer are identical and are selected from the group consisting of polystyrene and polystyrene homologs. In some embodiments, the A and A' endblocks are polystyrene or poly(alpha-methylstyrene).

In some embodiments, the styrene block copolymers are styrene-butadiene-styrene block copolymers, referred to as SBS.

In some embodiments, the recycled styrene block copolymers have a pre-consumer waste origin. In some embodiments, the recycled styrene block copolymers include minor amounts of heterogeneous polymer or non-polymeric components.

In some embodiments, the recycled styrene block copolymer contains from 1 to 15 wt %, alternatively from 3 to 12 wt %, of other components selected from the group consisting of polyethylene, polypropylene, and inorganic material. In some embodiments, the recycled styrene block copolymer contains a propylene homopolymer, an ethylene polymer, and talc as an inorganic additive.

In some embodiments, the (r-SBC) has a melt flow rate (ISO 1133 230 °C/2.16 kg) from 1.0 to 10 g/10 min, alternatively from 2.0 to 8.0 g/10 min.

In some embodiments, the r-SBC has a density ranging from 0.95 to 0.965 g/cm$^3$, alternatively in the range 0.960 to 0.965 g/cm$^3$ (ISO 1183-1). In some embodiments, the r-SBC has a Shore D lower than 45, alternatively lower than 40, alternatively lower than 30.

As used herein, the term "composition (I)" refers to a composition prepared according to the procedure reported in comparative Example 1 of Patent Cooperation Treaty Publication No. WO03/011962. In some embodiments, the propylene polymer composition shows a tensile modulus value lower than the tensile modulus of the composition (I), alternatively lower than the tensile module of the polypropylene composition (A), alternatively equal to or lower than the value obtained by applying the equation $TMod(A)\cdot(x)+TMod(B)\cdot(1-x)$ where TMod(A) is the tensile modulus of component A alone, TMod(B) is the tensile modulus of component (B) alone, and x is the weight percentage of component (A), based on the total weight of (A)+(B). In some embodiments, the tensile modulus of the propylene polymer composition ranges from 20 to 110 MPa, alternatively from 30 to 100 MPa.

In some embodiments, the values of stress at break and tear resistance for the propylene polymer composition are in line with the values of stress at break and tear resistance for component (A) alone.

In some embodiments, the propylene polymer composition has a Shore D (15 sec) lower than the Shore D of component (A), alternatively equal to or lower than the value obtained by applying the equation $ShoreD\ (A)\cdot(x)+$ ShoreD(B)·(1−x) where ShoreD(A) is the Shore D value of polypropylene composition (A) alone, ShoreD(B) is the Shore D value of component (B) alone, and x is the weight percentage of component (A), based on the total weight of (A)+(B). In some embodiments, the Shore D value of the propylene polymer composition is lower than 35, alternatively lower than 30.

In some embodiments, the propylene polymer composition shows a value of puncture resistance in line or better than that of the polypropylene composition (A) alone, alternatively in the range (max force) of from 150 to 350 N, alternatively from 200 to 300 N.

In some embodiments, the propylene polymer composition is obtained by mechanical blending components (A) and (B).

In some embodiments, component (B) is mechanically blended with a preformed polypropylene composition (A) made from or containing components (a) and (b). In some embodiments, polypropylene composition (A) is prepared from sequential copolymerization of components (a) and (b).

In some embodiments, the propylene polymer composition is further made from or containing additives, fillers, and pigments. In some embodiments, the additives are nucleating agents. In some embodiments, the fillers are extension oils or mineral fillers. In some embodiments, the pigments are selected from the group consisting of organic and inorganic pigments. In some embodiments, the fillers are inorganic fillers selected from the group consisting of talc, calcium carbonate, and mineral fillers. In some embodiments, the fillers improve mechanical properties, such as flexural modulus and HDT. In some embodiments, talc has a nucleating effect.

In some embodiments, nucleating agents are added in quantities ranging from 0.05 to 2 wt %, alternatively from 0.1 to 1 wt %, with respect to the total weight.

In some embodiments, the propylene polymer composition is extruded to form films or sheets for a variety of applications. In some embodiments, the sheets are for roofing applications.

In some embodiments, the present disclosure provides an extruded article made from or containing the propylene polymer composition. In some embodiments, the extruded article is a sheet for roofing applications.

The following examples are given to illustrate, but not limit the present disclosure.

EXAMPLES

Characterizations

Xylene-Soluble (XS) Fraction at 25 °C 2.5 g of polymer and 250 ml of xylene were introduced into a glass flask equipped with a refrigerator and a magnetic stirrer. The temperature was raised in 30 minutes up to the boiling point of the solvent. The resulting clear solution was then kept under reflux and stirred for 30 minutes. The closed flask was then kept for 30 minutes in a bath of ice and water, then in a thermostatic water bath at 25 °C for 30 minutes. The resulting solid was filtered on quick filtering paper. 100 ml of the filtered liquid were poured into a pre-weighed aluminum container, which was heated on a heating plate under nitrogen flow, thereby removing the solvent by evaporation. The container was then kept in an oven at 80 °C under vacuum until a constant weight was obtained. The weight percentage of polymer soluble in xylene at room temperature was then calculated.

The content of the xylene-soluble fraction is expressed as a percentage of the original 2.5 grams and then, by the difference (complementary to 100%), the xylene insoluble percentage (%);

XS of components (a) and/or (b) were calculated by using the formula:

$$XStot = WaXSA + WbXSB$$

wherein Wa and Wb are the relative amount of components (a) and (b) respectively, and (a)+(b)=1.

Melt Flow Rate (MFR)

Measured according to ISO 1133 at 190 °C or 230 °C with a load of 2.16 kg, as specified.

Intrinsic Viscosity (IV)

The sample was dissolved in tetrahydronaphthalene at 135 °C and then poured into a capillary viscometer. The viscometer tube (Ubbelohde type) was surrounded by a cylindrical glass jacket. This setup allowed for temperature control with a circulating thermostatic liquid. The downward passage of the meniscus was timed by a photoelectric device.

The passage of the meniscus in front of the upper lamp started the counter which had a quartz crystal oscillator. The counter stopped as the meniscus passed the lower lamp. The efflux time was registered and converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Polydispersity index: Determined at a temperature of 200 °C by using a parallel plates rheometer model RMS-800 marketed by RHEOMETRICS (USA), operating at an oscillation frequency which increased from 0.1 rad/sec to 100 rad/sec. From the crossover modulus, the P.I. was derived from the equation:

$$P.I. = 10^5/Gc$$

wherein Gc is the crossover modulus which is defined as the value (expressed in Pa) at which G'=G" wherein G' is the storage modulus and G" is the loss modulus.

Ethylene (C2) Content $^{13}C$ NMR of Propylene/Ethylene Copolymers $^{13}C$ NMR spectra were acquired on a Bruker AV-600 spectrometer equipped with cryoprobe, operating at 160.91 MHz in the Fourier transform mode at 120 °C The peak of the $S_{\beta\beta}$ carbon (nomenclature according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536) was used as internal standard at 29.9 ppm. The samples were dissolved in 1,1,2,2-tetrachloroethane-d2 at 120 °C with an 8% wt/v concentration. Each spectrum was acquired with a 90° pulse, 15 seconds of delay between pulses and CPD, thereby removing 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, *Macromolecules* 1982, 15, 4, 1150-1152) using the following equations:

$$PPP = 100\ T_{\beta\beta}/S \quad PPE = 100\ T_{\beta\delta}/S \quad EPE = 100\ T_{\delta\delta}/S$$

$$PEP = 100\ S_{\beta\beta}/S \quad PEE = 100\ S_{\beta\delta}/S \quad EEE = 100\ (0.25\ S_{\gamma\delta} + 0.5\ S_{\delta\delta})/S$$

$$S = T_{\beta\beta} + T_{\beta\delta} + T_{\delta\delta} + S_{\beta\beta} + S_{\beta\delta} + 0.25\ S_{\gamma\delta} + 0.5\ S_{\delta\delta}$$

The molar percentage of ethylene content was evaluated using the following equation:

$$E\ \%\ \text{mol} = 100 * [PEP + PEE + EEE]$$

The weight percentage of ethylene content was evaluated using the following equation:

$$E\ \%\ \text{wt.} = \frac{100 * E\ \%\ \text{mol} * MW_E}{E\ \%\ \text{mol} * MW_E + P\ \% * MW_P}$$

where P % mol is the molar percentage of propylene content, while $MW_E$ and $MW_P$ are the molecular weights of ethylene and propylene, respectively.

The product of reactivity ratio $r_1r_2$ was calculated according to Carman (C. J. Carman, R. A. Harrington and C. E. Wilkes, Macromolecules, 1977; 10, 536) as:

$$r_1r_2 = 1 + \left(\frac{EEE + PEE}{PEP} + 1\right) - \left(\frac{P}{E} + 1\right)\left(\frac{EEE + PEE}{PEP} + 1\right)^{0.5}$$

The tacticity of Propylene sequences was calculated as mm content from the ratio of the PPP $mmT_{\beta\beta}$ (28.90-29.65 ppm) and the whole $T_{\beta\beta}$ (29.80-28.37 ppm).

Samples for the Mechanical Tests

Samples were obtained according to ISO 1873-2:2007.

Charpy impact test was determined according to ISO 179-1eA, and ISO 1873-2

Elongation at yield: measured according to ISO 527.

Elongation at break: measured according to ISO 527. The values reported in the tables are mean values of the measurements in MD and TD.

Stress at break: measured according to ISO 527. The values reported in the tables are mean values of the measurements in MD and TD.

Tensile Modulus according to ISO 527-2. The values reported in the tables are mean values of the measurements in MD and TD.

Tear Resistance according to the method ASTM D 1004 on 1 mm-thick extruded sheets. Crosshead speed: 51 mm/min; V-shaped die cut specimen. The values reported in the tables are mean values of the measurements in MD and TD.

Shore D on injection molded, compression molded plaques, and extruded sheets according to the method ISO 868 (15 sec).

Melting Point and Crystallization Point

The melting point was measured by using a DSC instrument according to ISO 11357-3, at scanning rate of 20 C/min both in cooling and heating, on a sample of weight between 5 and 7 mg., under inert $N_2$ flow. Instrument was calibrated with Indium.

EXAMPLES

Comparative Example 1

A composition (I) was prepared according to the procedure reported in comparative Example 1 of Patent Cooperation Treaty Publication No. WO03/011962. The characterization is reported in Table 1.

r-SBS (1)

The pre-consumer recycled SBS material had a MFR of 4.1 g/10 min and 88% of solubility in xylene at 25 °C. The r-SBS also contained 3% wt of talc, 3% wt of propylene homopolymer, and 4% wt of ethylene polymer. The characterization is reported in Table 1.

Example 1

The polymer particles of the heterophasic composition (I) prepared in comparative example 1 were introduced in an extruder (Berstorff extruder), wherein the polymer particles were mixed with 10% wt (based on the total amount of polyolefins) of recycled SBS(1) and 1000 ppm of M.S. 168 as an additive. The polymer particles were extruded under nitrogen atmosphere in a twin screw extruder, at a rotation speed of 250 rpm and a melt temperature of 200-250 °C. The characterization of the obtained composition is reported in Table 1.

Example 2

A polymer composition was prepared according to the procedure of Example 1 with the difference that 20% of recycled SBS(1) was used. The characterization of the obtained composition is reported in Table 1.

TABLE 1

| Examples and comparative examples | | C1 | r-SBS(1) | 1 | 2 |
|---|---|---|---|---|---|
| MFR [g/10 min] | | 0.6 | 4.1 | 0.8 | — |
| Tensile Modulus [N/mm$^2$] | | 110 | 42 | 76 | 76 |
| Stress at break [N/mm$^2$] | | 16.6 | — | 17.1 | 16.4 |
| Shore D [15 sec] | | 30 | 20 | 26.8 | 26.2 |
| Tear Resistance [N] | | 74 | — | 75 | 74 |
| Elongation at break [%] | | 695 | 570 | 685 | 695 |
| Puncture Resistance | Max force [N] | 249 | — | 240.0 | 218.0 |
| | Deformation at break [mm] | 45.5 | — | 41.0 | 38.7 |

Comparative Example 2

A further composition (II) was prepared according to the procedure reported in comparative Example 1 of Patent Cooperation Treaty Publication No. WO03/011962. The characterization is reported in Table 2.

r-SBS(2)

The pre-consumer recycled SBS material had a MFR of 7.4 g/10' and 39.3 wt. % of solubility in xylene at 25 °C. The characterization is reported in Table 2.

Example 3

A polymer composition was prepared according to the procedure of Example 1 with the difference that 10 wt % of r-SBS (2) was mixed with 90 wt % of the heterophasic composition (II). The characterization of the obtained composition is reported in Table 2.

Example 4

A polymer composition was prepared according to the procedure of Example 3 with the difference that 15 wt % of r-SBS(2) was used. The characterization of the obtained composition is reported in Table 2.

Example 5

A polymer composition was prepared according to the procedure of Example 3 with the difference that 20 wt % of r-SBS (2) was used. The characterization of the obtained composition is reported in Table 2.

TABLE 2

| Examples and comparative examples | | C2 | rSBS(2) | 3 | 4 | 5 |
|---|---|---|---|---|---|---|
| MFR [g/10 min] | | 0.5 | 7.4 | 0.6 | 0.6 | 0.7 |
| Tensile Modulus [N/mm$^2$] | | 95 | 220 | 102 | 106 | 100 |
| Stress at break [N/mm$^2$] | | 18.2 | 14.5 | 18.0 | 19.7 | 19.2 |
| Shore D [15 sec] | | 32.7 | 36.2 | 33.1 | 30.8 | 30.6 |
| Tear Resistance [N] | | 78 | — | 77 | 78 | 75 |
| Elongation at break [%] | | 725 | 660 | 715 | 730 | 734 |
| Puncture | Max force [N] | 276 | — | 260 | 260 | 259 |
| Resistance | Deformation at break [mm] | 48.2 | — | 42.0 | 42.3 | 42.3 |

What is claimed is:

1. A propylene polymer composition, having a melt flow rate (ISO 1133-230 °C/2.16 kg) ranging from 0.4 to 1.4 g/10 min, comprising:

(A) from 65 to 95 wt % of a polypropylene composition, having a melt flow rate (ISO 1133 230 °C/2.16 kg) ranging from 0.2 to 1.2 g/10 min, comprising:

from 15 to 40 wt % of a polymer fraction (a) comprising a propylene homopolymer, or a copolymer of propylene with one or more comonomers selected from ethylene and a $CH_2$═CHR alpha-olefin, where R is a $C_2$-$C_8$ alkyl radical, or mixtures thereof, wherein the copolymer containing at least 85 wt % of units derived from propylene and the polymer fraction (a) being insoluble in xylene at 25 °C for at least 90 wt %; and from 60 to 85 wt % of a polymer fraction (b) comprising a copolymer of ethylene with comonomers selected from propylene and CH2═CHR alpha-olefins, where R is a $C_2$-$C_8$ alkyl radical, or mixtures thereof, wherein the copolymer containing units derived from ethylene in a quantity lower than 40 wt % and the polymer fraction (b) having solubility in xylene at 25 °C greater than 60 wt %, wherein the total percentage of fractions (a) and (b) in the polypropylene composition (A) being 100, and (B) from 5 to 35 wt % of a recycled styrene block copolymer (SBC), having a melt flow rate (ISO 1133-230 °C/2.16 kg) from 0.5 to 15 g/10 min;

the percentages of (A) and (B) being referred to the sum of (A) and (B).

2. The propylene polymer composition according to claim 1, wherein the component (A) ranges from 70 to 93 wt % and component (B) ranges from 7 to 30 wt %.

3. The propylene polymer composition according to claim 1, wherein the fraction (a) ranges from 28 to 40 wt % and the polymer fraction (b) ranges from 60 to 72 wt %.

4. The propylene polymer composition according to claim 1, having a melt flow rate (ISO 1133 230 °C/2.16 kg) ranging from 0.5 to 1.2 g/10 min.

5. The propylene polymer composition according to claim 1, wherein the polypropylene composition (A) has a melt flow rate ranging from 0.3 to 1.0 g/10 min.

6. The propylene polymer composition according to claim 1, wherein the total ethylene content of polypropylene composition (A) ranges from 15.0 to 28.0 wt %.

7. The propylene polymer composition according to claim 1, wherein the polypropylene composition (A) has a tensile modulus value ranging from 40 to 250 MPa.

8. The propylene polymer composition according to claim 1, wherein the polypropylene composition (A) has a value of Shore D (15 sec) ranging from 25 to 40.

9. The propylene polymer composition according to claim 1, wherein component (B) contains from 1 to 15% wt of other components selected from the group consisting of polyethylene, polypropylene, and inorganic material.

10. The propylene polymer composition according to claim 1, wherein the recycled styrene block copolymer (B) contains a propylene homopolymer, an ethylene polymer, and talc as an inorganic additive.

11. The propylene polymer composition according to claim 1, having a tensile modulus value lower than the tensile modulus of the polypropylene composition (A).

12. The propylene polymer composition according to claim 1, having a value of Shore D (15 sec) lower than the Shore D of the polypropylene composition (A).

13. An extruded article comprising the propylene polymer composition according to claim 1.

14. The extruded article according to claim 13, wherein the article is a sheet for roofing applications.

* * * * *